United States Patent
Singh et al.

(10) Patent No.: US 11,086,954 B1
(45) Date of Patent: Aug. 10, 2021

(54) METHOD AND SYSTEM FOR DATA TESTING

(71) Applicant: Bank of America Corporation, Charlotte, NC (US)

(72) Inventors: Mandeep Singh, Charlotte, NC (US); Veerasekhar Addepalli, Charlotte, NC (US); Lei Chen, Charlotte, NC (US); Waleed Fathy Khedr, Charlotte, NC (US); Danielle Sullivan, Charlotte, NC (US); Barry Sullivan, Charlotte, NC (US); Ivorine Do, Charlotte, NC (US); Yile Sun, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 0 days.

(21) Appl. No.: 16/924,616

(22) Filed: Jul. 9, 2020

(51) Int. Cl.
*G06F 16/955* (2019.01)
*H04L 29/08* (2006.01)
*H04L 29/06* (2006.01)

(52) U.S. Cl.
CPC ............ *G06F 16/955* (2019.01); *H04L 67/02* (2013.01); *H04L 67/12* (2013.01); *H04L 67/42* (2013.01)

(58) Field of Classification Search
CPC .................. G06F 16/90–955; H04L 67/02–42
See application file for complete search history.

(56) References Cited

U.S. PATENT DOCUMENTS

| | | | |
|---|---|---|---|
| 7,424,465 B2 | 9/2008 | Schuppert et al. | |
| 8,185,608 B1* | 5/2012 | York | G06Q 30/02 709/218 |
| 8,594,990 B2 | 11/2013 | Brooks | |
| 2007/0156382 A1 | 7/2007 | Graham et al. | |
| 2008/0059395 A1 | 3/2008 | Flinn et al. | |
| 2011/0054960 A1* | 3/2011 | Bhatia | G06Q 30/02 705/7.12 |
| 2012/0131476 A1* | 5/2012 | Mestres | G06F 11/3684 715/753 |
| 2013/0282430 A1 | 10/2013 | Kannan et al. | |
| 2014/0052853 A1* | 2/2014 | Mestres | G06F 11/3684 709/224 |
| 2014/0082593 A1* | 3/2014 | Alper | G06F 11/3672 717/126 |
| 2014/0304106 A1 | 10/2014 | Dahan | |
| 2016/0063423 A1 | 3/2016 | Rao et al. | |

* cited by examiner

*Primary Examiner* — Clayton R Williams
(74) *Attorney, Agent, or Firm* — Banner & Witcott, Ltd.; Michael A. Springs (57) ABSTRACT

Methods, systems, and computing platforms for data communication and testing are disclosed. One or more hardware processors may be configured by machine-readable instructions to: electronically process a plurality of computer executable instructions associated with a plurality of call-to-action code for at least one uniform resource network node in a computer-data communication-based network. The processor(s) may be configured to electronically determine if the call-to-action code is associated with a same container of the at least one uniform resource network node. The one or more hardware processors are further configured by the instructions electronically assign a rank order to the treatment set of call-to-action code.

16 Claims, 4 Drawing Sheets

METHOD AND SYSTEM FOR DATA TESTING

FIELD OF THE DISCLOSURE

The present disclosure relates to methods, systems, and computing platforms for data communication for testing of website sites.

BACKGROUND

An application programming interface (API) connects a computer program to a programming library. Moore's law predicted that the number of transistors on a computer chip would double every two years while the chip's price would remain constant. "Moore's law" meant consumers could buy the better technology two years later for about the same price. Fifty years later, Moore's law prediction has endured to the idea that technology companies have recognized Moore's law as a benchmark, or fall behind in the market. Patrons have come to expect technological products to be faster, cheaper, and more compact over time. This expectation seems to have driven trends of rapid growth in computing power, smaller devices, the ability to connect to the Internet, and reduction in cost and data.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

One aspect of the present disclosure relates to a method for data communication and testing such that via a computer-data communication-based network, a recommendation system enables personalization of immersive digital experiences dynamically with user interactions and updates the sites or processing logic to accommodate the user information interactions. In some implementations of the method, a recommendation system eliminates testing bias by randomly assigning a slot to place a testing item. In random selection, each slot in the widget has equal probability of being chosen as the testing item slot, therefore it cancels out the effect of a confounding factor. In some implementations, the recommendation system conducts unbiased testing in the dynamic computer system.

In some implementations of the system and method, one or more hardware processors configured by machine-readable instructions to: electronically process a plurality of computer executable instructions associated with a plurality of call-to-action code for at least one uniform resource network node in a computer-data communication-based network. The processor(s) may be configured to electronically determine if the call-to-action code is associated with a same container of the at least one uniform resource network node. The processor(s) may be configured to responsive to electronically assign a random testing slot to the call-to-action code among a plurality of testing slots in the container. The processor(s) may be configured to if the call-to-action code is not associated with a same container of the at least one uniform resource network node, then electronically randomly assign each of the call-to-action code to one of a plurality of testing slots. The processor(s) may be configured to execute the call-to-action code with real-time computer readable data in the computer-data communication-based network.

In some implementations of the system and method, the processor(s) may be further configured to electronically modify a widget presentation associated with the at least one uniform resource network node. The processor(s) may be further configured to divide the plurality of call-to-action code into a treatment set of call-to-action code and a control set of call-to-action code.

In some implementations of the system and method, the processor(s) may be further configured to electronically modify a widget presentation associated with the at least one uniform resource network node based on treatment set of call-to-action code.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

In the following description of the various embodiments, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
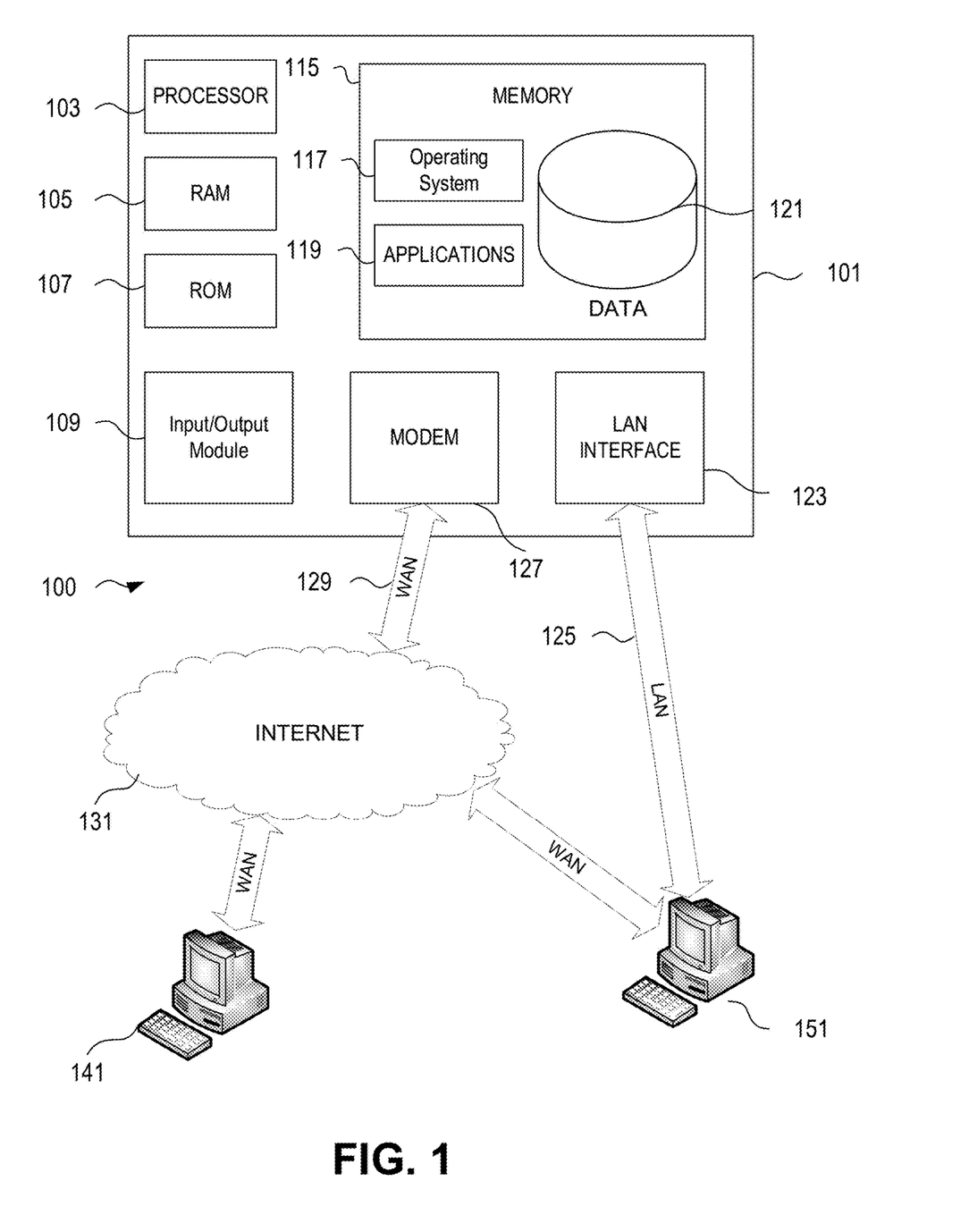
FIG. 1 illustrates a schematic diagram of a digital computing environment in which certain aspects of the present disclosure may be implemented.

FIG. 1 illustrates a block diagram of a specific programmed computing device 101 (e.g., a computer server) that may be used according to an illustrative embodiment of the disclosure. The computer server 101 may have a processor 103 for controlling overall operation of the server and its associated components, including RAM 105, ROM 107, input/output module 109, and memory 115.

Input/Output (I/O) 109 may include a microphone, keypad, touch screen, camera, and/or stylus through which a user of device 101 may provide input, and may also include one or more of a speaker for providing audio output and a video display device for providing textual, audiovisual and/ or graphical output. Other I/O devices through which a user and/or other device may provide input to device 101 also may be included. Software may be stored within memory 115 and/or storage to provide computer readable instructions to processor 103 for enabling server 101 to perform various technologic functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of characteristics associated with vendors and patrons, allowing functional interoperability between different elements located at multiple physical locations.

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various protocols such as TCP/IP, Ethernet, FTP, HTTP and the like is presumed.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of computing systems, environments, and/or configurations that may be suitable for use with the disclosure include, but are not limited to, personal computers, server computers, handheld or laptop devices, multiprocessor systems, microprocessor-based systems, set top boxes, programmable consumer electronics, network PCs, minicomputers, mainframe computers, mobile computing devices, e.g., smart phones, wearable computing devices, tablets, distributed computing environments that include any of the above systems or devices, and the like.

The disclosure may be described in the context of computer-executable instructions, such as program modules, being executed by a computer. Generally, program modules include routines, programs, objects, components, data structures, etc. that perform particular tasks or implement particular computer data types. The disclosure may also be practiced in distributed computing environments where tasks are performed by remote processing devices that are linked through a communications network. In a distributed computing environment, program modules may be located in both local and remote computer storage media including memory storage devices.

Figure 2:
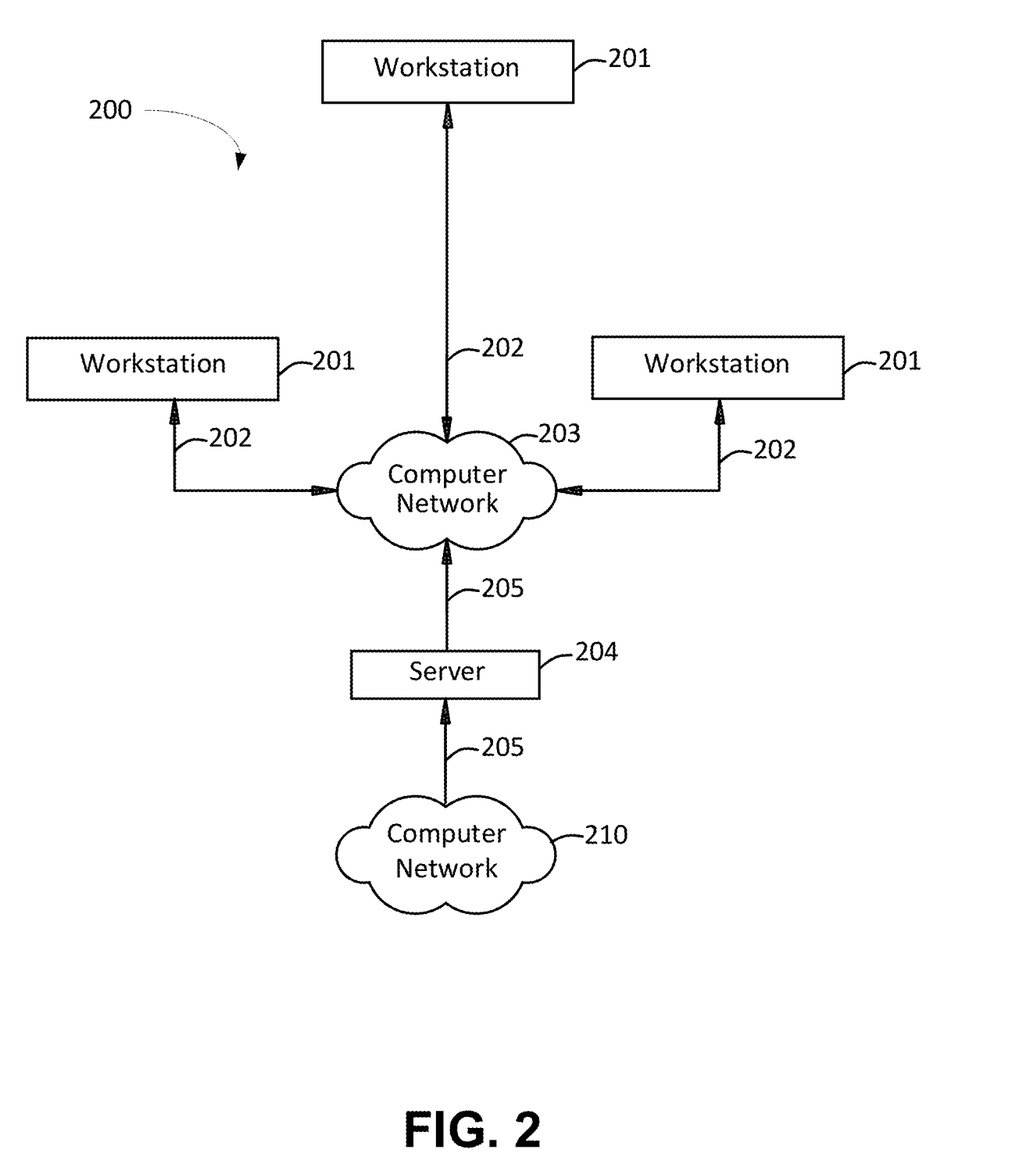
FIG. 2 is an illustrative block diagram of workstations and servers that may be used to implement the processes and functions of certain embodiments of the present disclosure.

Referring to FIG. 2, an illustrative system 200 for implementing methods according to the present disclosure is shown. As illustrated, system 200 may include one or more workstations 201. Workstations 201 may be local or remote, and are connected by one or more communications links 202 to computer networks 203, 210 that is linked via communications links 205 to server 204. In system 200, server 204 may be any suitable server, processor, computer, or data processing device, or combination of the same. Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

Figure 3:
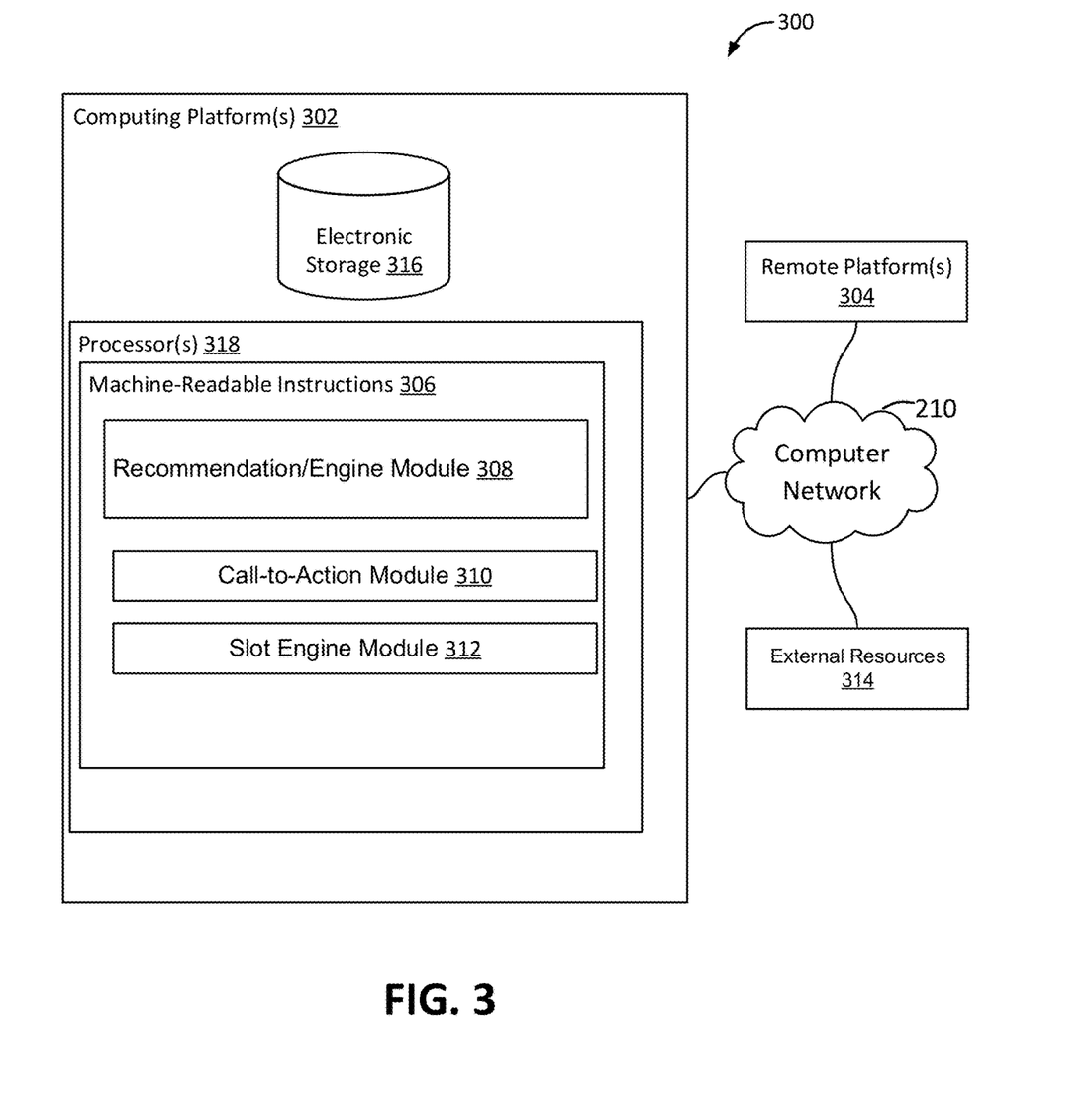
FIG. 3 illustrates a system configured for data communication and testing, in accordance with one or more implementations.

FIG. 3 illustrates a system 300 configured for data communication and testing, in accordance with one or more implementations. In some implementations, system 300 may include one or more computing platforms 302. Computing platform(s) 302 may be configured to communicate with one or more remote platforms 304 according to a client/server architecture, a peer-to-peer architecture, and/or other architectures. Remote platform(s) 304 may be configured to communicate with other remote platforms via computing platform(s) 302 and/or according to a client/server architecture, a peer-to-peer architecture, and/or other architectures. Users may access system 300 via remote platform(s) 304. The network 203 can be sending data using OSI Open Systems Interconnection (OSI) model, including the transport layer (OSI layer 4). Protocols such as TCP/IP may be utilized for transport of data.

Computing platform(s) 302 may be configured by machine-readable instructions 306. Machine-readable instructions 306 may include one or more instruction modules. The instruction modules may include computer program modules. The instruction modules may include one or more of Recommendation Engine/Module 308, Call-To-Action Module 310, Testing Slot Engine/Module 312, and/or other instruction modules.

The modules 308, 310, 312 and other modules implement APIs containing functions/sub-routines which can be executed by another software system, such as email and internet access controls. API denotes an Application Programming Interface. The systems and methods of the present disclosure can be implemented in various technological computing environments including Simple Object Access Protocol (SOAP) or in the Representational State Transfer (REST). REST is the software architectural style of the World Wide Web. REST APIs are networked APIs that can be published to allow diverse clients, such as mobile applications, to integrate with the organizations software services and content. Many commonly-used applications work using REST APIs as understood by a person of skill in the art.

A class of software known commonly as packaged apps or widgets are implemented in the present disclosure. Widgets in the present disclosure may be full-fledged client-side applications that are authored using technologies, such as HyperText Markup Language (HTML), CSS (Cascading StyleSheets), or Hypertext Preprocessor (PHP) or other programming languages, and then packaged for deployment in the network 203. Examples widgets in system 300 may be complex applications that pull data from multiple external sources 314 to be integrated and presented to a user in some interesting and useful way.

The recommendation system 300 integrates analytical personalization approaches for website data feeds recommendation engine/module 308 and design of experimentation (DOE). The web services that feed into many different software applications may be updated, but can be tested to ensure compatibility with different applications in live situations through call-to-action within the widgets. In particular, using the recommendation system, may use a script (such as in JAVA in JavaScript Object Notation—"JSON") may be created having the data parameters being tested.

The recommendation system 300 enables personalization of immersive digital experiences dynamically with user interactions and updates the sites or processing logic to accommodate the ever-changing user information interests. One implementation of the present disclosure, DOE system executes controlled experiments to inform decisions. The DOE implementation of the present disclosure, variations can be introduced in a few testing items while the rest of the site page design can remain unchanged. The recommendation system 300 provides a scalable and integrated system that is capable of accommodating both recommendation and DOE computer readable instructions. Users can be exposed to a URL site with personalized contents updated or rearranged by the recommendation module 308 while simultaneously participate in the online controlled experiments to help improve data feeds of sites and resolve logic decisions.

Referring to FIG. 3, in one implementation, the recommendation module 308 takes each input's most recent digital interactions from the web pages and attributes, rank orders of all the available call-to-action modules 310 subsequently updates the call-to-action module 310 ranking scores for a user from the previous run. When the user visits a URL site, a uniform resource locator (URL) or uniform response Indicator (URI) of a resource, the ranking scores may be used to rearrange the call-to-action (CTAs) module or other web module within each widget, then help re-construct the entire Web-page layout. Each widget can display up to a defined number (K) of CTAs. In the present system 300, different versions of CTA modules 310 designs are proposed and comparisons to be made between the new design and the original design based on priority values. Widgets are the distinctive sections of a web page that have a central theme. CTAs are the hyperlinks that reside within each widget, and lead users to the electronic resources 314 associated with widget or other sources.

In one implementation of the system 300, a small proportion of the users who visit webpages may be randomly selected to participate in the experiment. The participating users can be divided into two experimental groups: "treatment logic group" in which users will see the new webpage design and a "control logic group" in which the user will see the original/default webpage design. Multiple experiments for CTAs can be set up on website page, and they can either be parallel or exclusive of each other. In one implementation, if a user was selected in one of the exclusive experiments, the same user can no longer be sampled in any other experiments. However, users can be selected to participate multiple parallel experiments simultaneously.

Referring to FIG. 3, in one implementation, for the selective experiments, the integrative system 300 with slot engine 312 can randomly select a slot for each individual user out of the N maximum slots within a widget to place the CTA 310 in testing. If a user was selected in one of the parallel experiments, and N parallel experiments are tested on the same widget, the integrative system 300 with slot module 312 may randomly pick N slots out of the K positions to place each testing CTA from the parallel experiments. The testing CTA may stay in the randomly selected slot throughout the experiment for users who are sampled as part of the experiment testing and validation process. The placement of the rest of the CTAs within the widget will be updated according to the testing CTA's position and the latest ranking scores from the recommendation module 308.

A problem with the existing methods attempts to combine an algorithm outcome with the DOE testing usually have the testing item placement pre-defined. Therefore, the testing item will be placed at the same slot for each individual client throughout the experiment. The testing item placement fixation will confound the statistical tests, because effect of significant differences between the treatment group and the control group may be a result of the actual design/logic differences (what DOE intends to test), or the result is influenced by the particular position where the testing item is placed (confounding factor). In other words, the effect of difference seen between the control and treatment group will be subjectively biased by testing item placement.

In an implementation of the present disclosure, recommendation system 300 eliminates the bias by randomly assigning a slot to place a testing item—CTA. In random selection, each slot in the widget has equal probability of being chosen as the testing item slot, therefore it cancels out the effect of the confounding factor. In some implementations, the recommendation system 300 conducts unbiased testing in the dynamic system.

The data payload includes the "attribute data" including ASCII characters in computer readable form or binary complied data. The ASCII characters or binary data can be manipulated in the software of system 300.

In some implementations of system 300, a container pertains to a software package that contains everything the software needs to run. This includes the executable program as well as system tools, libraries, and settings. Containers are allowed to be isolated from the other software and the operating system itself which enable portability between operating systems, In some implementations, computing platform(s) 302, remote platform(s) 304, and/or external resources 314 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 302, remote platform(s) 304, and/or external resources 314 may be operatively linked via some other communication media.

A given remote platform 304 may include one or more processors configured to execute computer program modules. The computer program modules may be configured to enable an expert or user associated with the given remote platform 304 to interface with system 300 and/or external resources 314, and/or provide other functionality attributed herein to remote platform(s) 304. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms.

External resources 314 may include sources of information outside of system 300, external entities participating with system 300, and/or other resources. In some implementations, some or all of the functionality attributed herein to external resources 314 may be provided by resources included in system 300.

Computing platform(s) 302 may include electronic storage 316, one or more processors 318, and/or other components. Computing platform(s) 302 may include communication lines, or ports to enable the exchange of information with a network and/or other computing platforms. Illustration of computing platform(s) 302 in FIG. 3 is not intended to be limiting. Computing platform(s) 302 may include a plurality of hardware, software, and/or firmware components operating together to provide the functionality attributed herein to computing platform(s) 302. For example, computing platform(s) 302 may be implemented by a cloud of computing platforms operating together as computing platform(s) 302.

Electronic storage 316 may comprise non-transitory storage media that electronically stores information. The electronic storage media of electronic storage 316 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 316 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 316 may include one or more virtual storage resources (e.g., cloud storage, a virtual private network, and/or other virtual storage resources). Electronic storage 316 may store software algorithms, information determined by processor(s) 318, information received from computing platform(s) 302, information received from remote platform(s) 304, and/or other information that enables computing platform(s) 302 to function as described herein.

Processor(s) 318 may be configured to provide information processing capabilities in computing platform(s) 302. As such, processor(s) 318 may include one or more of a digital processor, an analog processor, a digital circuit designed to process information, an analog circuit designed to process information, a state machine, and/or other mechanisms for electronically processing information. Although processor(s) 318 is shown in FIG. 3 as a single entity, this is for illustrative purposes only. In some implementations, processor(s) 318 may include a plurality of processing units. These processing units may be physically located within the same device, or processor(s) 318 may represent processing functionality of a plurality of devices operating in coordination. Processor(s) 318 may be configured to execute modules 308, 310, and/or 312, and/or other modules. Processor(s) 318 may be configured to execute modules 308, 310, and/or 312, and/or other modules by software; hardware; firmware; some combination of software, hardware, and/or firmware; and/or other mechanisms for configuring processing capabilities on processor(s) 318. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308, 310, and/or 312 are illustrated in FIG. 3 as being implemented within a single processing unit, in implementations in which processor(s) 318 includes multiple processing units, one or more of modules 308, 310, and/or 312 may be implemented remotely from the other modules. The description of the functionality provided by the different modules 308, 310, and/or 312 described below is for illustrative purposes, and is not intended to be limiting, as any of modules 308, 310, and/or 312 may provide more or less functionality than is described. For example, one or more of modules 308, 310, and/or 312 may be eliminated, and some or all of its functionality may be provided by other ones of modules 308, 310, and/or 312. As another example, processor(s) 318 may be configured to execute one or more additional modules that may perform some or all of the functionality attributed below to one of modules 308, 310, and/or 312.

Figure 4A:
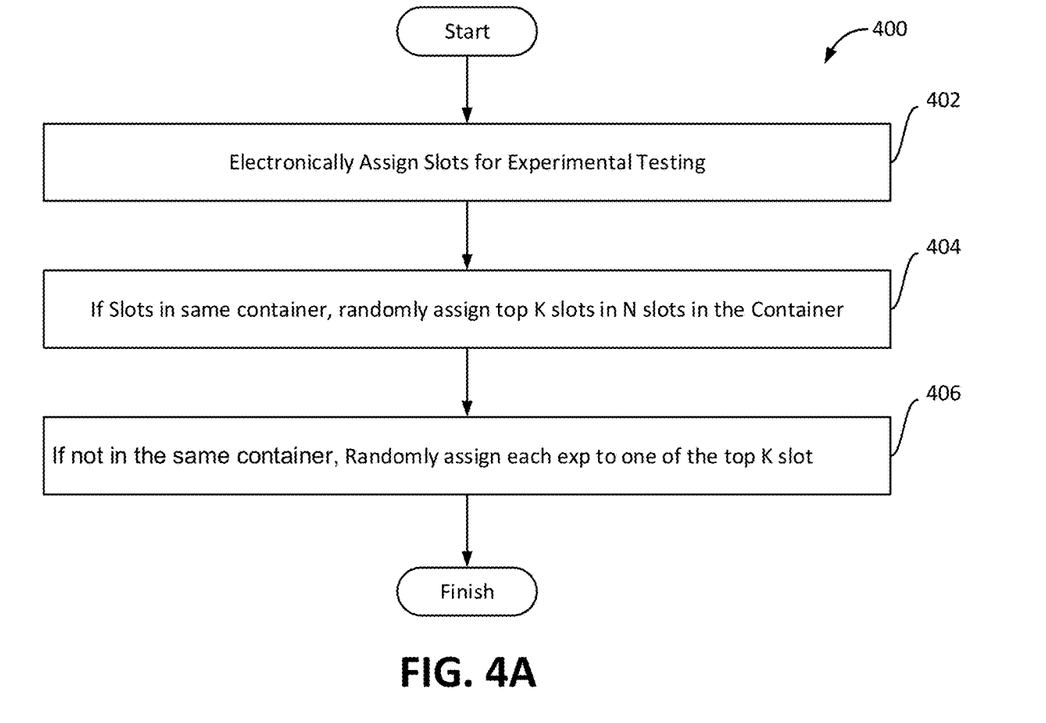
FIGS. 4A and 4B illustrate a method for data communication, in accordance with one or more implementations.
Figure 4B:
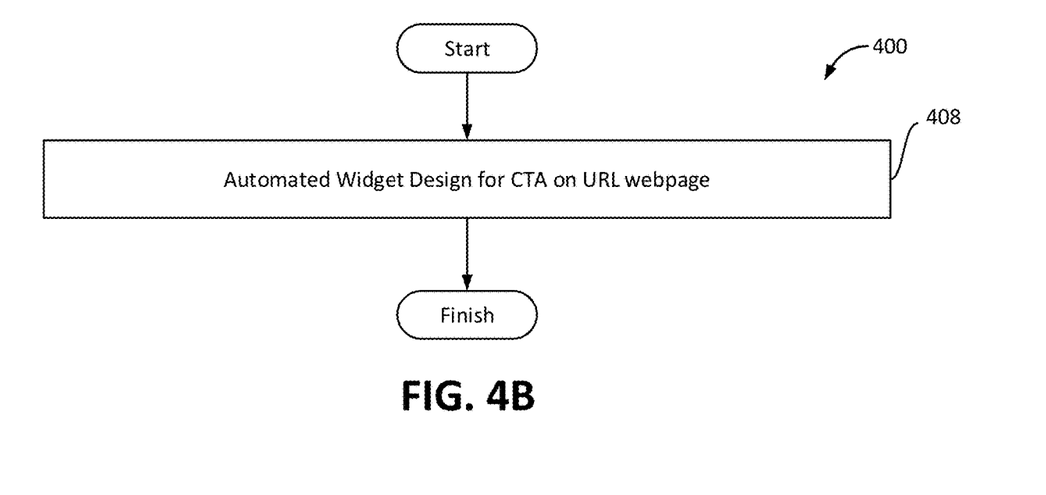

FIGS. 4A and/or 4B illustrates a method 400 for data communication with anomaly detection in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIGS. 4A and/or 4B and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

FIG. 4A illustrates method 400, in accordance with one or more implementations. An operation 402 may include electronically processing a plurality of computer executable instructions associated with a plurality of call-to-action code for at least one uniform resource network node in a computer-data communication-based network 210. Further, operation 402 may include the plurality of call-to-action code being further divided in a treatment set of call-to-action code and a control set of call-to-action code. Operation 402 may be performed by one or more hardware processors configured by machine-readable instructions including a module that is the same as or similar to module 308, in accordance with one or more implementations.

An operation 404 may include electronically determining if the call-to-action code is associated with a same container of the at least one uniform resource network node. Further, operation 404 may include electronically assigning a random testing slot to the call-to-action code among a plurality of testing slots in the container. Operation 404 may be performed by one or more hardware processors configured by machine-readable instructions including a module that is the same as or similar to module 308, 310 in accordance with one or more implementations.

An operation 406 may include if the call-to-action code is not associated with a same container of the at least one uniform resource network node, then the process flows to electronically randomly assign each of the call-to-action code to one of a plurality of testing slots. Operation 406 may be performed by one or more hardware processors configured by machine-readable instructions including a module that is the same as or similar to module 308, 310, 312, in accordance with one or more implementations.

FIG. 4B illustrates method 400, in accordance with one or more implementations. The data payload may include executing the call-to-action code with real-time computer readable data in the computer-data communication-based network. Further, operation 408 may include electronically modifying the widget presentation associated with the at least one uniform resource network node based on the treatment set of call-to-action code. Operation 408 may be performed by one or more hardware processors configured by machine-readable instructions including a module that is the same as or similar to module 308, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. An electronic computer implemented method of data communication including computer executable instructions, comprising steps of:
   a) electronically processing a plurality of computer executable instructions associated with a plurality of call-to-action code for at least one uniform resource network node in a computer-data communication-based network;
   b) electronically determining if the call-to-action code is associated with a same container of the at least one uniform resource network node;
   c) responsive to step b) electronically assigning a random testing slot to the call-to-action code among a plurality of testing slots in the container; and
   d) if the call-to-action code is not associated with a same container of the at least one uniform resource network node in step b), electronically randomly assigning each of the call-to-action code to one of a plurality of testing slots; and
   executing the call-to-action code with real-time computer readable data in the computer-data communication-based network.

2. The method of claim 1, further comprising step e) electronically modifying a widget presentation associated with the at least one uniform resource network node.

3. The method of claim 2, wherein the plurality of call-to-action code is further divided in a treatment set of call-to-action code and a control set of call-to-action code.

4. The method of claim 3, wherein step e) further comprises electronically modifying the widget presentation associated with the at least one uniform resource network node based on the treatment set of call-to-action code.

5. The method of claim 4, further comprising electronically assigning a rank order to the treatment set of call-to-action code.

6. A system configured for data communication, the system comprising:
   one or more hardware processors configured by machine-readable instructions to:
   a) electronically process a plurality of computer executable instructions associated with a plurality of call-to-action code for at least one uniform resource network node in a computer-data communication-based network;
   b) electronically determine if the call-to-action code is associated with a same container of the at least one uniform resource network node;
   c) responsive to step b) electronically assign a random testing slot to the call-to-action code among a plurality of testing slots in the container; and
   d) if the call-to-action code is not associated with a same container of the at least one uniform resource network node in step b) electronically randomly assign each of the call-to-action code to one of a plurality of testing slots; and
   execute the call-to-action code with real-time computer readable data in the computer-data communication-based network.

7. The system of claim 6, wherein the one or more hardware processors are further configured by machine-readable instructions to step e) electronically modify a widget presentation associated with the at least one uniform resource network node.

8. The system of claim 7, wherein the one or more hardware processors are further configured by machine-readable instructions such that the plurality of call-to-action code is further divided in a treatment set of call-to-action code and a control set of call-to-action code.

9. The system of claim 8, wherein the one or more hardware processors are further configured by machine-readable instructions to electronically modify the widget presentation associated with the at least one uniform resource network node based on the treatment set of call-to-action code.

10. The system of claim 8, wherein the one or more hardware processors are further configured by machine-readable instructions to electronically assign a rank order to the treatment set of call-to-action code.

11. A computing platform configured for data communication, the computing platform comprising:
    a non-transient computer-readable storage medium having executable instructions embodied thereon; and
    one or more hardware processors configured to execute the instructions to:
    a) electronically process a plurality of computer executable instructions associated with a plurality of call-to-action code for at least one uniform resource network node in a computer-data communication-based network;
    b) electronically determine if the call-to-action code is associated with a same container of the at least one uniform resource network node;
    c) responsive to step b) electronically assign a random testing slot to the call-to-action code among a plurality of testing slots in the container; and
    d) if the call-to-action code is not associated with a same container of the at least one uniform resource network node in step b) electronically randomly assign each of the call-to-action code to one of a plurality of testing slots; and
    execute the call-to-action code with real-time computer readable data in the computer-data communication-based network.

12. The computing platform of claim 11, wherein the one or more hardware processors are further configured by the executable instructions to step e) electronically modify a widget presentation associated with the at least one uniform resource network node.

13. The computing platform of claim 12, wherein the one or more hardware processors are further configured by the executable instructions to electronically modify the widget presentation associated with the at least one uniform resource network node based on a treatment set of call-to-action code.

14. The computing platform of claim 13, wherein the one or more hardware processors are further configured by the executable instructions such that the plurality of call-to-action code is further divided in a treatment set of call-to-action code and a control set of call-to-action code.

15. The computing platform of claim 14, wherein the one or more hardware processors are further configured by the executable instructions to electronically modify the widget presentation associated with the at least one uniform resource network node based on the treatment set of call-to-action code.

16. The computing platform of claim 14, wherein the one or more hardware processors are further configured by the executable instructions electronically assign a rank order to the treatment set of call-to-action code.

\* \* \* \* \*